(12) United States Patent
Wang et al.

(10) Patent No.: US 8,035,879 B2
(45) Date of Patent: Oct. 11, 2011

(54) ELECTROWETTING DISPLAY DEVICE

(75) Inventors: Wen-Chun Wang, Taichung (TW);
Kuo-Chang Su, Tainan County (TW);
Cheng-Yi Chen, Chang Hua County (TW)

(73) Assignee: Wintek Corporation, Taichung (TW)

( * ) Notice: Subject to any disclaimer, the term of this patent is extended or adjusted under 35 U.S.C. 154(b) by 204 days.

(21) Appl. No.: 12/537,007

(22) Filed: Aug. 6, 2009

(65) Prior Publication Data

US 2010/0033798 A1 Feb. 11, 2010

(30) Foreign Application Priority Data

Aug. 8, 2008 (TW) ............... 97130358 A
Jun. 26, 2009 (TW) ............... 98121511 A

(51) Int. Cl.
*G02F 1/03* (2006.01)
*G02B 26/02* (2006.01)

(52) U.S. Cl. ........ 359/245; 359/228; 359/253; 359/315; 359/316; 359/318; 345/32; 345/41; 345/84; 345/214

(58) Field of Classification Search .......... 359/228, 359/290, 245, 252, 253, 272, 276, 296, 315, 359/316, 318, 320, 321, 665, 666; 345/32, 345/41, 48, 55, 84, 85, 97, 105, 107, 204, 345/214; 349/1, 12
See application file for complete search history.

(56) References Cited

U.S. PATENT DOCUMENTS

| | | | | |
|---|---|---|---|---|
| 6,449,081 B1 * | 9/2002 | Onuki et al. | ........... | 359/245 |
| 6,603,444 B1 * | 8/2003 | Kawanami et al. | ........... | 345/32 |
| 7,274,416 B2 * | 9/2007 | Feenstra et al. | ........... | 349/78 |
| 7,548,363 B2 * | 6/2009 | Hayes et al. | ........... | 359/276 |
| 7,636,187 B2 * | 12/2009 | Morozumi et al. | ........... | 359/228 |
| 7,800,816 B2 * | 9/2010 | Hayes et al. | ........... | 359/320 |
| 7,847,996 B2 * | 12/2010 | Chen et al. | ........... | 359/228 |
| 7,872,693 B2 * | 1/2011 | Chen | ........... | 349/12 |
| 7,898,718 B2 * | 3/2011 | Feenstra et al. | ........... | 359/253 |
| 2007/0127108 A1 | 6/2007 | Hayes et al. | | |
| 2009/0027317 A1 | 1/2009 | Cheng et al. | | |

FOREIGN PATENT DOCUMENTS

CN 101355836 A 1/2009
KR 10-2008-0060104 7/2008

* cited by examiner

*Primary Examiner* — Loha Ben
(74) *Attorney, Agent, or Firm* — Muncy, Geissler, Olds & Lowe, PLLC

(57) ABSTRACT

An electrowetting display device includes a first and a second transparent substrates, multiple partition walls, a polar liquid, a non-polar liquid, and a phosphor layer. The non-polar liquid is opaque and immiscible with the polar liquid. The phosphor layer is formed on at least one of the first and the second transparent substrates. The phosphor layer comprises a first part that transforms the short-wavelength light into red light, a second part that transforms the short-wavelength light into green light, and a third part that transforms the short-wavelength light into blue light or allows the short-wavelength light to pass therethrough without transformation. Each of the first, the second, and the third parts is corresponding to one pixel unit.

20 Claims, 12 Drawing Sheets

ELECTROWETTING DISPLAY DEVICE

CROSS REFERENCE TO RELATED APPLICATION

This application claims priority of application No. 097130358 filed on Aug. 8, 2008 and application No. 098121511 filed on Jul. 26, 2009 in Taiwan R.O.C under 35 U.S.C. §119; the entire contents of which are hereby incorporated by reference.

BACKGROUND OF THE INVENTION

1. Field of the Invention

The invention relates to an electrowetting display device, particularly to an electrowetting display device having a luminescence conversion mechanism.

2. Description of the Related Art

FIG. 1A and FIG. 1B show a cross-section of a display unit 100 of a conventional electrowetting display device. Referring to FIG. 1A and FIG. 1B, the display unit 100 includes a polar aqueous solution 102, black ink 104 and a hydrophobic dielectric layer 106. As shown in FIG. 1A, when a voltage is not applied to the display unit 100, the black ink 104 evenly covers a top surface of the hydrophobic dielectric layer 106, and thus ambient light is absorbed by the black ink 104 to form a dark state. In comparison, as shown in FIG. 11B, when a voltage source 116 applies a voltage to a transparent electrode 108, an interface between the hydrophobic dielectric layer 106 and the aqueous solution 102 is polarized to have high surface energy, and thus the hydrophobic dielectric layer 106 that becomes less hydrophobic enables the black ink 104 to move towards a partition wall 112. At this time, the ambient light is reflected by a base plate 114 (such as a white-colored plate) to form a bright state. Such design is power-saving because images are displayed in black and white by means of the ambient light. However, the monochromic or black and white display fails to provide colorful visual effects, and such design may cease to function when the amount of ambient light is insufficient.

FIG. 2A and FIG. 2B show a cross-section of a display unit 200 of another conventional electrowetting display device. Referring to FIG. 2A, the display unit 200 similarly has a polar aqueous solution 202, a hydrophobic dielectric layer 206, a transparent electrode 208, partition walls 212, a transparent substrate 214, and a white light 216 used as a backlight source. According to this design, the black ink shown in FIG. 1A is replaced with a combination of red ink 204R, green ink 204G and blue ink 204B. A voltage source 218 applies a voltage to the transparent electrode 208 to control the distribution of each colored ink to achieve full color display. However, such design has inferior color saturation and fails to achieve full black display. Specifically, since the area of the dielectric layer 206 covered by each colored ink are adjusted to change the intensity of its corresponding color, the remaining area not covered by the colored ink may cause leakages of white light to decrease color saturation. As shown in FIG. 2A, for a blue display unit assigned to produce a blue color, surrounding white light is, however, mixed in the blue light, and some red light and green light from adjacent display units may be also mixed in the blue light to decrease color saturation. Further, as shown in FIG. 2B, in case only the grey levels of blue light and red light are adjusted, surrounding white light and some green light are liable to be mixed in the blue light and the red light to decrease color saturation. As a result, the shift in color hue and the decrease in color saturation often occur in the conventional design. Moreover, such design fails to achieve full black display. Even additional display units made of black ink are provided, the mix of surrounding white light still results in inferior color saturation.

BRIEF SUMMARY OF THE INVENTION

The invention relates to a full color electrowetting display device that has a luminescence conversion mechanism to achieve excellent color saturation.

According to an embodiment of the invention, an electrowetting display device includes a first transparent substrate and a second transparent substrate facing each other, a plurality of partition walls, a polar liquid, a non-polar liquid, and a phosphor layer. The partition walls are formed between the first and the second transparent substrates to divide the electrowetting display device into a plurality of pixel units. The polar liquid is disposed in each pixel unit, and the non-polar liquid is also disposed in each pixel unit. The non-polar liquid is opaque and immiscible with the polar liquid. The phosphor layer is formed on at least one of the first transparent substrate and the second transparent substrate and receives short-wavelength light incident to the electrowetting display device. The phosphor layer comprises a first part that transforms the short-wavelength light into a first light, a second part that transforms the short-wavelength light into a second light, and a third part that transforms the short-wavelength light into a third light or allows the short-wavelength light to pass therethrough without transformation. The first light, the second light and the third light are visible light and their respective wavelength bands are different from each other. Each of the first, the second, and the third parts is corresponding to one pixel unit.

In one embodiment, the polar liquid is an aqueous solution and the non-polar liquid is black ink.

In one embodiment, the short-wavelength light is blue light, the phosphor layer comprises a first part that transforms the blue light into red light, a second part that transforms the blue light into green light and a third part that allows the blue light to pass therethrough without transformation, and each of the first, the second, and the third parts is corresponding to one pixel unit.

In one embodiment, the short-wavelength light is ultraviolet light, the phosphor layer comprises a first part that transforms the ultraviolet light into red light, a second part that transforms the ultraviolet light into green light and a third part that transforms the ultraviolet light into blue light, and each of the first, the second, and the third parts is corresponding to one pixel unit.

According to the above embodiments, short wavelength light with high energy (such as blue light or ultraviolet light) is used as a light source for fluorescence excitation. On absorption of the energy, the electron in fluorescent materials moves to an excitation state at the next energy level, and finally this energy is released in the form of visible light (such as red light or green light) and the electron moves back down to a lower energy level. Thus, different wavelengths of visible light are obtained. As a result, when light from a light source such as an ultraviolet LED or a blue LED passes through or is transformed by the fluorescent materials of a phosphor layer, three primary colors of lights are obtained and then are controlled by light valves to achieve full color display. Compared with the conventional design, the above embodiments have simplified fabrication processes and are allowed to avoid the mix of surrounding white light or other colored light to increase color saturation. Further, the black ink that functions as light valves is opaque to achieve full black display.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
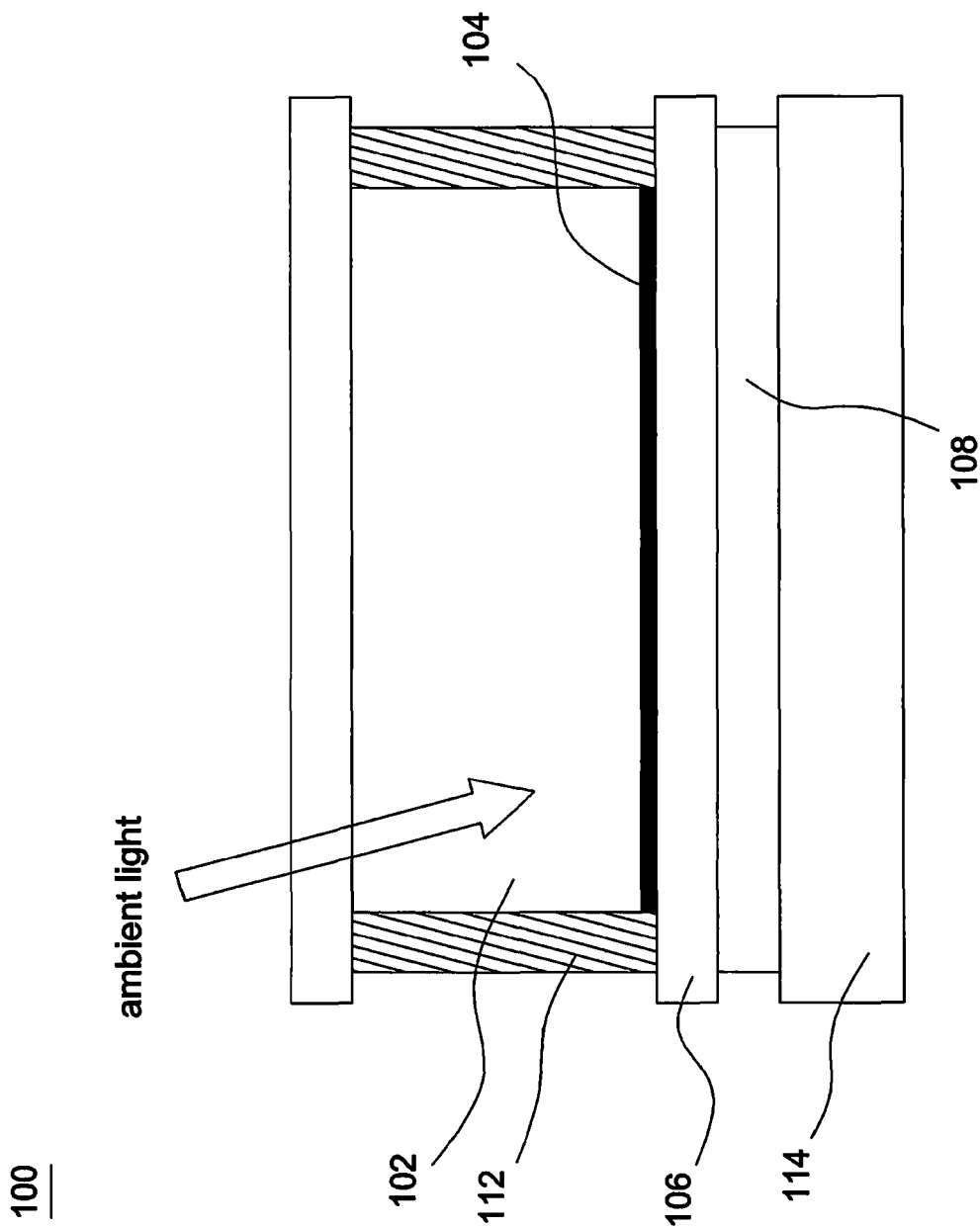
FIG. 1A and FIG. 1B show a cross-section of a display unit of a conventional electrowetting display device.
Figure 1B:
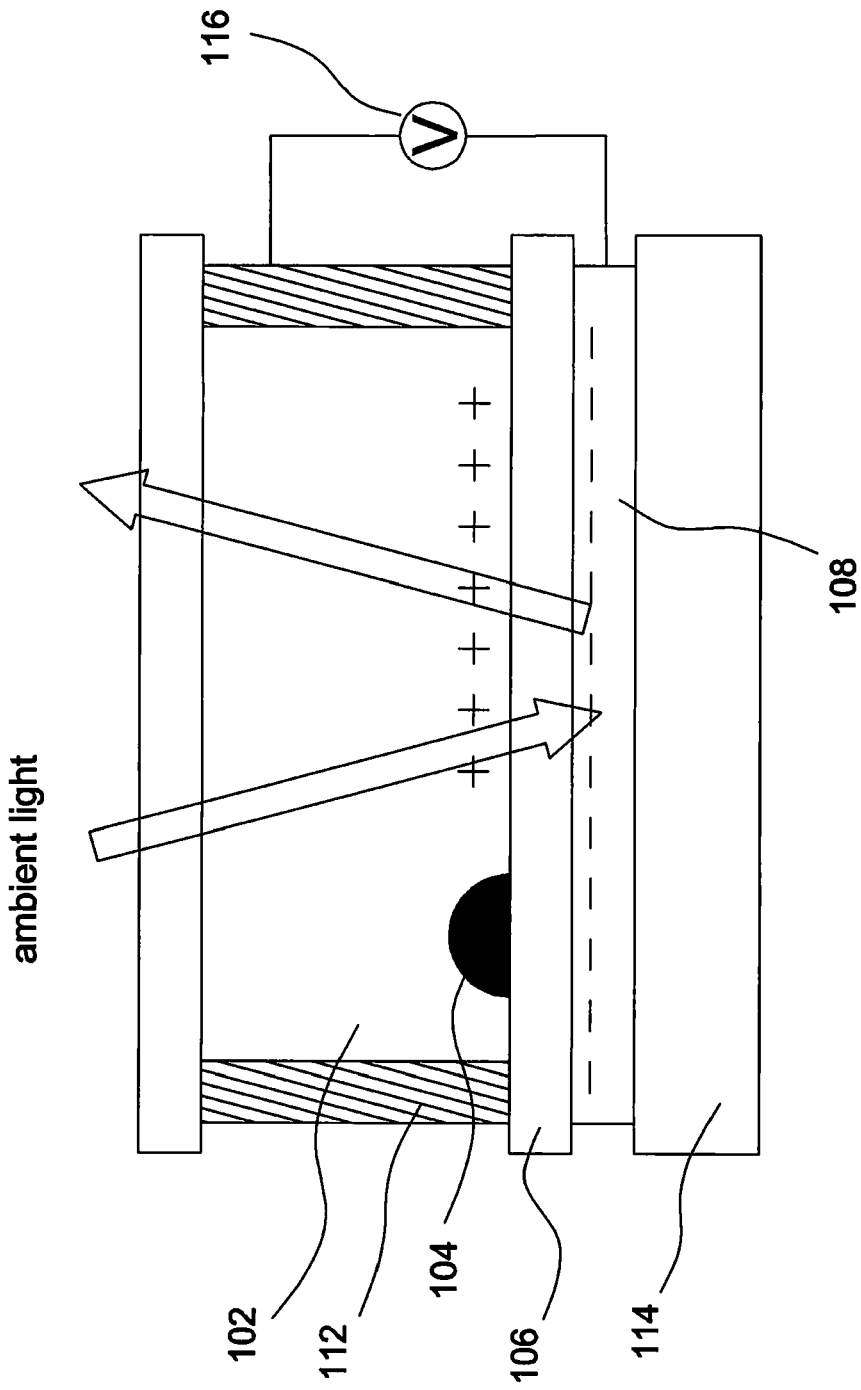
Figure 2A:
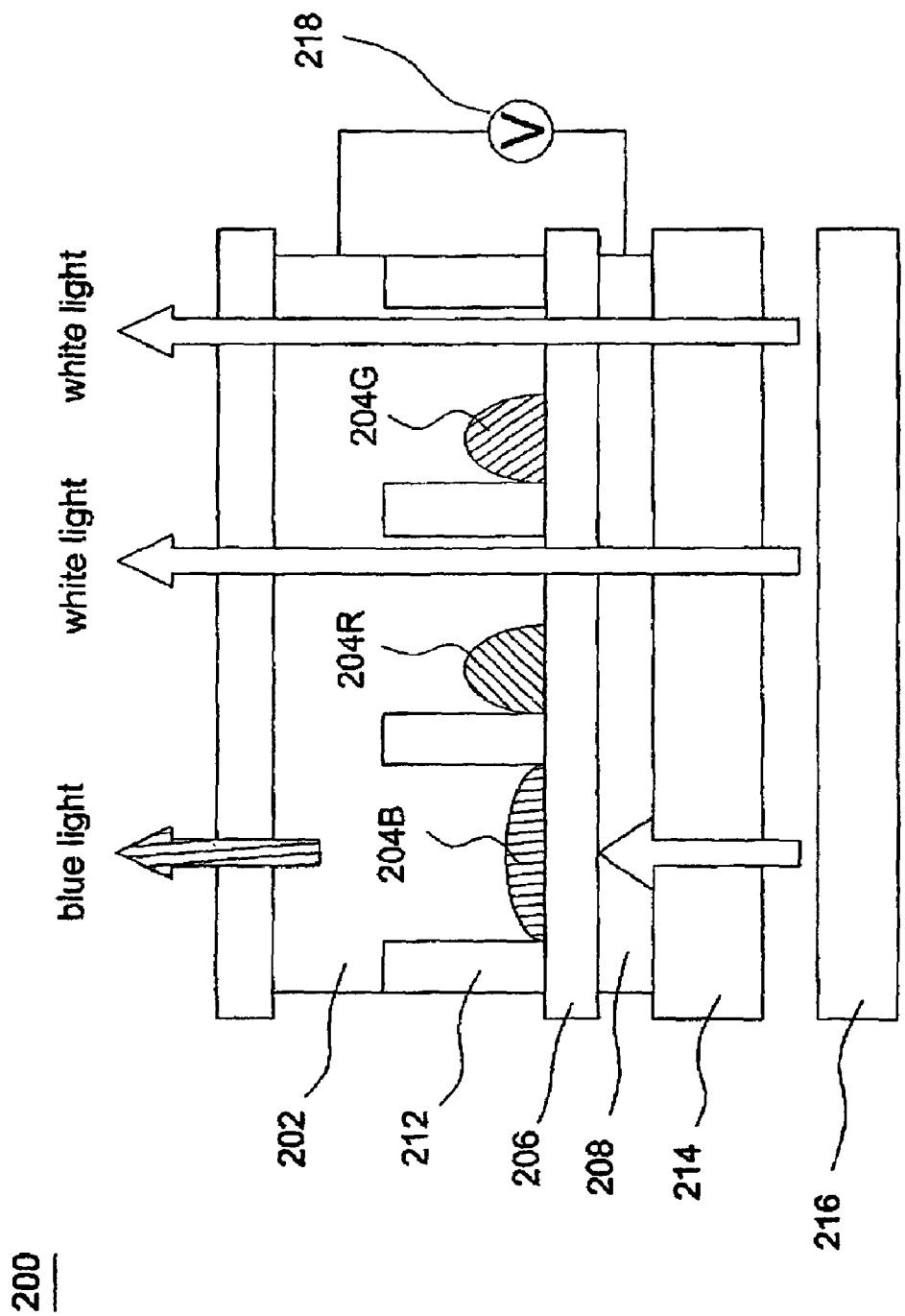
FIG. 2A and FIG. 2B show a cross-section of a display unit of another conventional electrowetting display device.
Figure 2B:
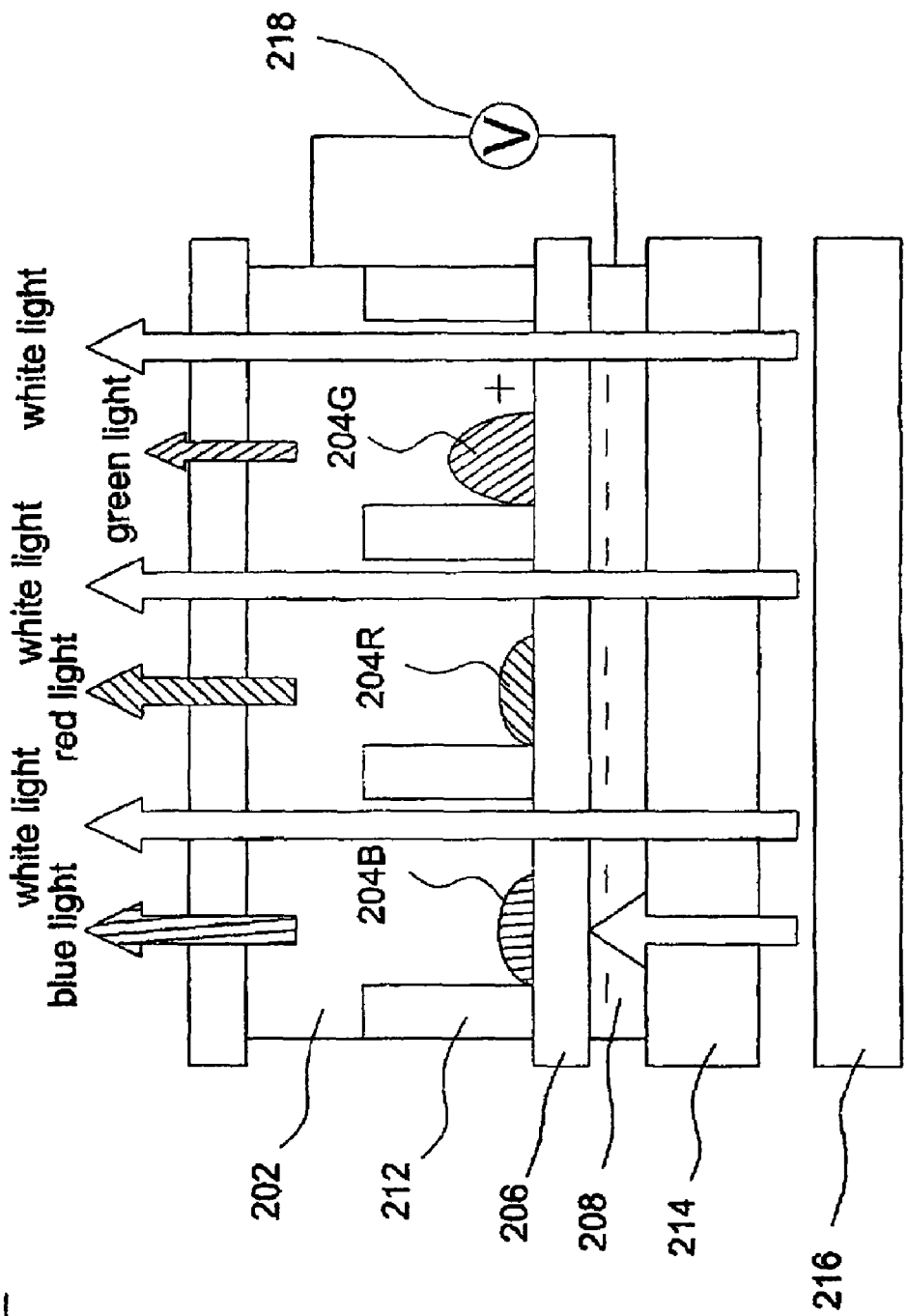
Figure 3:
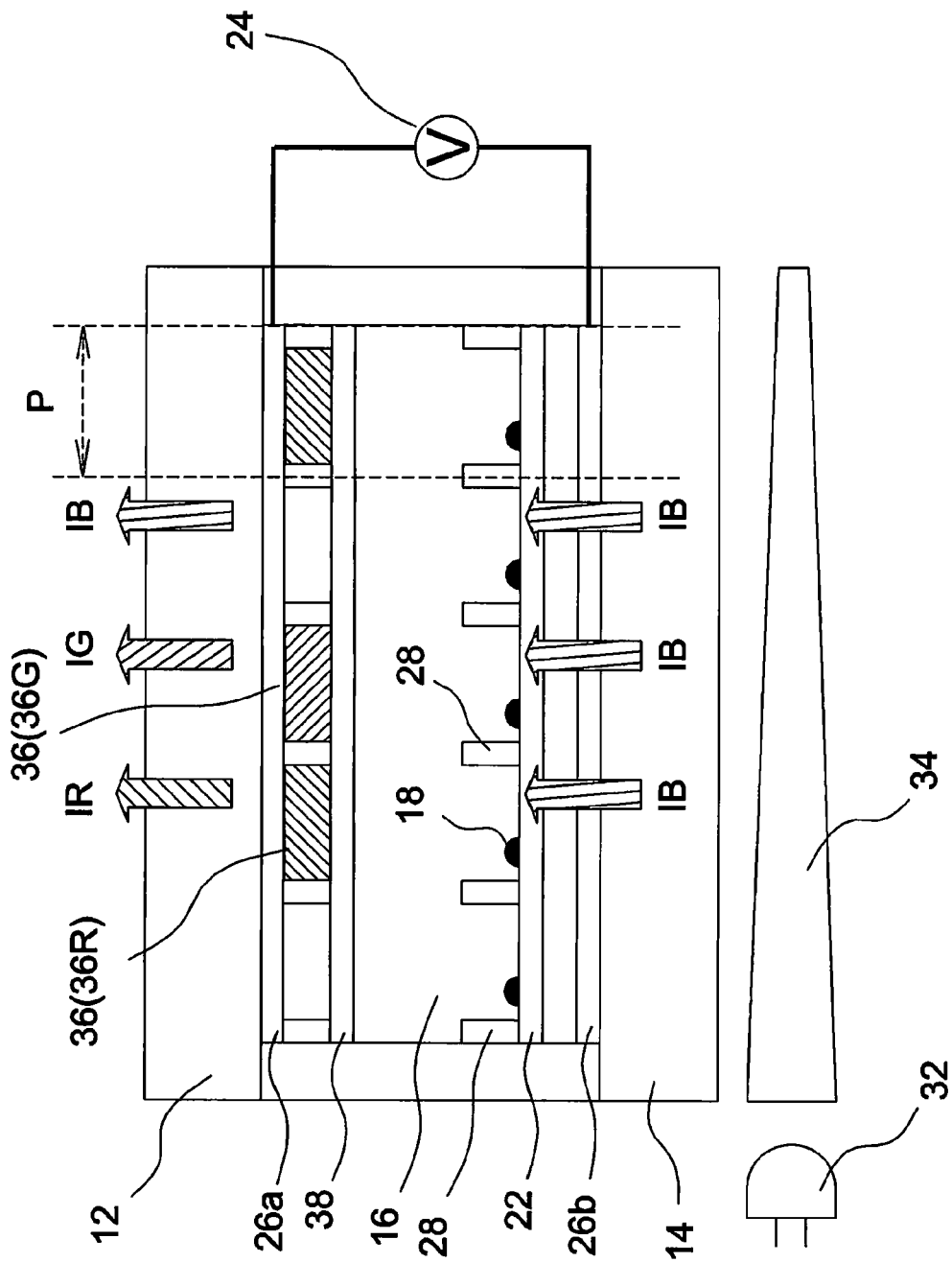
FIG. 3 shows a schematic diagram illustrating an electrowetting display device according to an embodiment of the invention.

FIG. 3 shows a schematic diagram illustrating an electrowetting display device 10a according to an embodiment of the invention. Referring to FIG. 3, the electrowetting display device 10a has a transparent top substrate 12 and a transparent bottom substrate 14 facing each other. A polar aqueous solution 16, a non-polar opaque oil-based liquid (such as black ink 18 immiscible with the aqueous solution), and a hydrophobic dielectric layer 22 are disposed between the top substrate 12 and the bottom substrate 14. Multiple partition walls 28 are formed between the top substrate 12 and the bottom substrate 14 to divide the room between them into multiple sub-spaces, and each sub-space is filled with the black ink 18 and the aqueous solution 16 and in correspondence with an addressable display unit. In other words, the partition walls 28 are allowed to separate the electrowetting display device 10a into multiple pixel units P, such as red pixels, green pixels, and blue pixels that are arranged in the form of a matrix. The hydrophobic dielectric layer 22 is formed between the partition walls 28 and the bottom substrate 14, and it is in contact with the black ink 18. When a voltage is not applied to the electrowetting display device 10a, the black ink 18 evenly covers a top surface of the hydrophobic dielectric layer 22 to block out the light. In comparison, when a voltage source 24 applies a voltage to a transparent top electrode 26a and a transparent bottom electrode 26b, an interface between the hydrophobic dielectric layer 22 and the aqueous solution 16 is polarized to have high surface energy, and thus the hydrophobic dielectric layer 22 that becomes less hydrophobic enables the black ink 18 to move towards the side of each partition wall 28 and allows for light transmission as a result. In this embodiment, a blue light LED 32 is used as a backlight source and a light guide plate 34 is used to uniform incoming light rays. A phosphor layer 36 is formed on an inner side of the top substrate 12 facing the bottom substrate 14. The phosphor layer 36 may contain a luminescence conversion material such as fluorescent powder. Further, since the aqueous solution 16 used to push the black ink 18 is sealed between two substrates 12 and 14, an overcoat layer 38 made of waterproof materials such as SiNx may be formed on the phosphor layer 36 to protect the phosphor layer 36. In this embodiment, the phosphor layer 36 includes at least a first part that transforms blue light IB into red light IR, a second part that transforms the blue light IB into green light IG, and a third part that allows the blue light IB to pass therethrough. The first, the second, and the third parts of the phosphor layer 36 correspond to a red pixel, a green pixel and a blue pixel, respectively. The first part of the phosphor layer 36 may contain fluorescent materials of $CaS:Eu^{3+}$ or $Y_2O_2S:Eu^{3+}$, and the second part of the phosphor layer 36 may contain fluorescent materials of $YBO_3:Ce^{3+}$, $YBO_3:Tb^{3+}$ or $SrGa_2O_4:Eu^{2+}$. When blue light IB emitted from the blue light LED 32 enters the electrowetting display device 10a, the blue light IB is absorbed by the fluorescent materials 36R and transformed into the red light IR since the first part of the phosphor layer 36 that corresponds to the red pixel contains fluorescent materials 36R. Similarly, the blue light IB is absorbed by the fluorescent materials 36G and transformed into the green light IG since the second part of the phosphor layer 36 that corresponds to the green pixel contains fluorescent materials 36G. Besides, the third part of the phosphor layer 36 that corresponds to the blue pixel is transparent to allow the blue light IB to pass, so the blue light IB directly passes the phosphor layer 36 to provide original blue color. As a result, three primary colors of lights (red, green and blue) are obtained to achieve full-color display. Further, according to this embodiment, the blue light IB is directly from the blue light LED 32 and not converted by fluorescent materials to achieve excellent color saturation.

Figure 4:
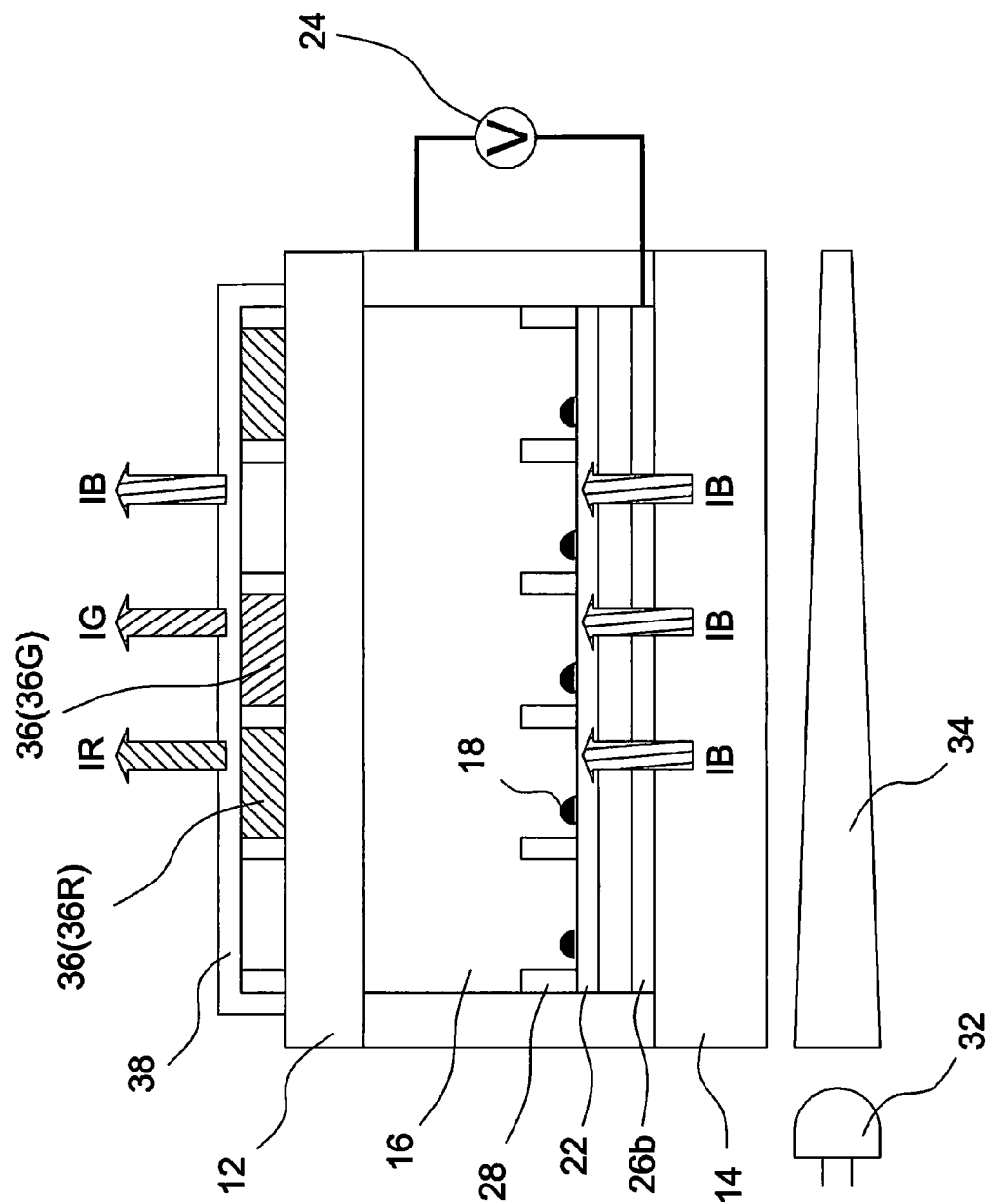
FIG. 4 shows a schematic diagram illustrating an electrowetting display device according to another embodiment of the invention.

FIG. 4 shows a schematic diagram illustrating an electrowetting display device 10b according to another embodiment of the invention. The luminescence conversion mechanism of the electrowetting display device 10b is the same as that of the electrowetting display device 10a, but the phosphor layer 36 of the electrowetting display device 10b is formed on an outer side of the top substrate 12 opposite the bottom substrate 14 and the voltage source 24 is directly connected to the aqueous solution 16 to omit the transparent top electrode 26a.

Figure 5:
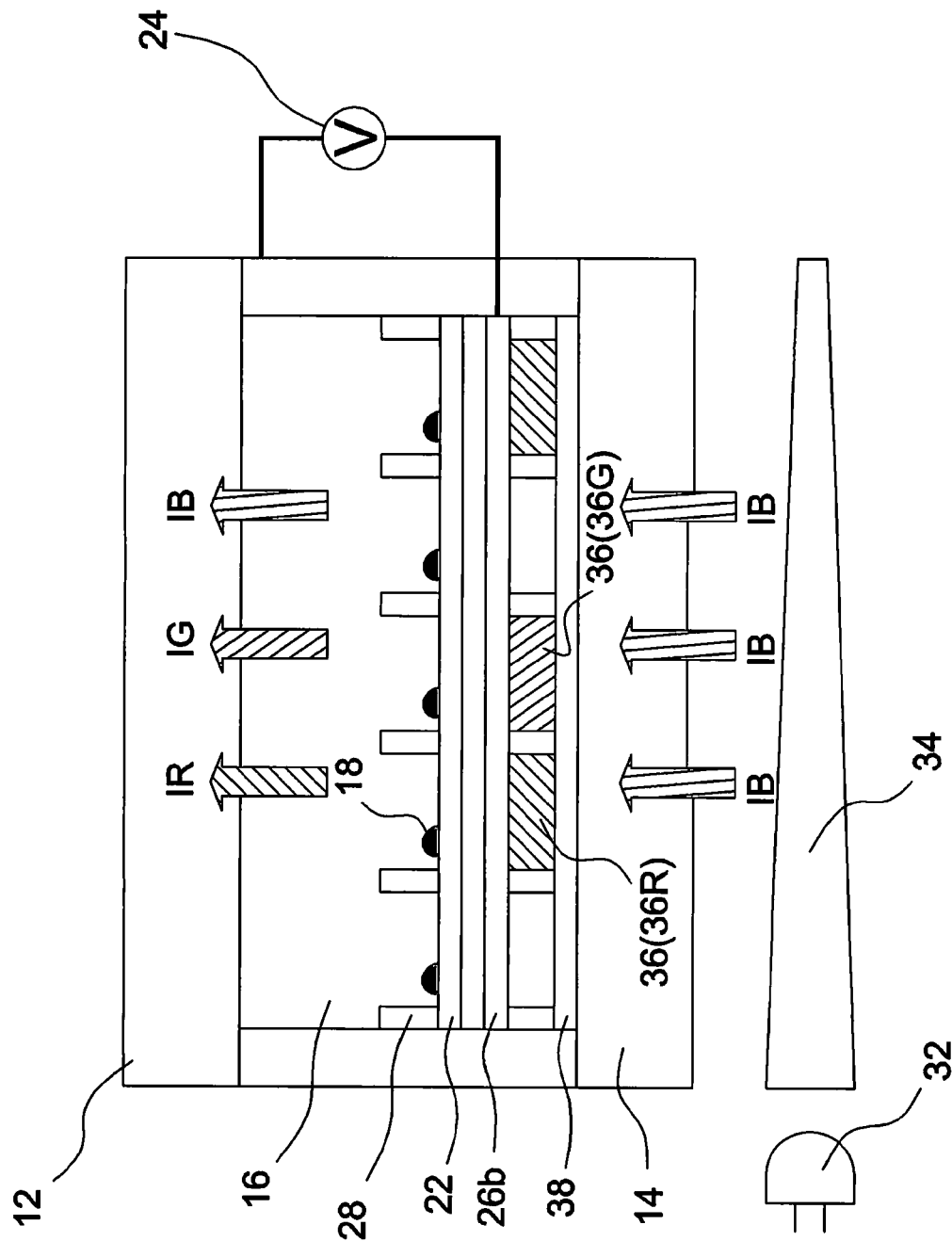
FIG. 5 shows a schematic diagram illustrating an electrowetting display device according to another embodiment of the invention.

FIG. 5 shows a schematic diagram illustrating an electrowetting display device 10c according to another embodiment of the invention. The luminescence conversion mechanism of the electrowetting display device 10c is the same as that of the electrowetting display device 10a, but the phosphor layer 36 of the electrowetting display device 10c is formed on an inner side of the bottom substrate 14 facing the top substrate 12 and the hydrophobic dielectric layer 22 and the aqueous solution 16 are provided on the phosphor layer 36 in succession.

Figure 6:
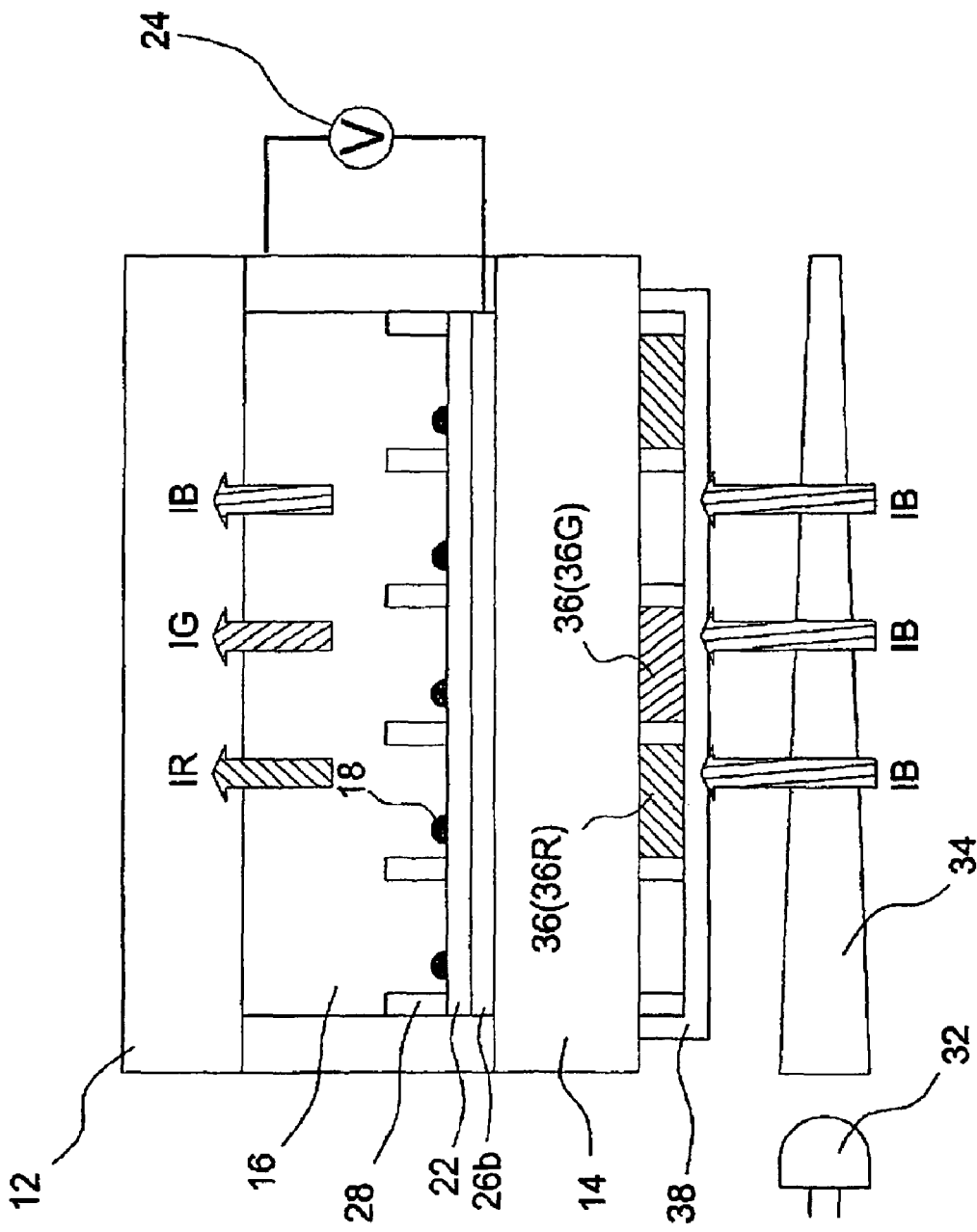
FIG. 6 shows a schematic diagram illustrating an electrowetting display device according to another embodiment of the invention.

FIG. 6 shows a schematic diagram illustrating an electrowetting display device 10d according to another embodiment of the invention. In this embodiment, the phosphor layer 36 is formed on an outer side of the bottom substrate 14 opposite the top substrate 12, and an overcoat layer 38 is formed on the phosphor layer 36.

Figure 7:
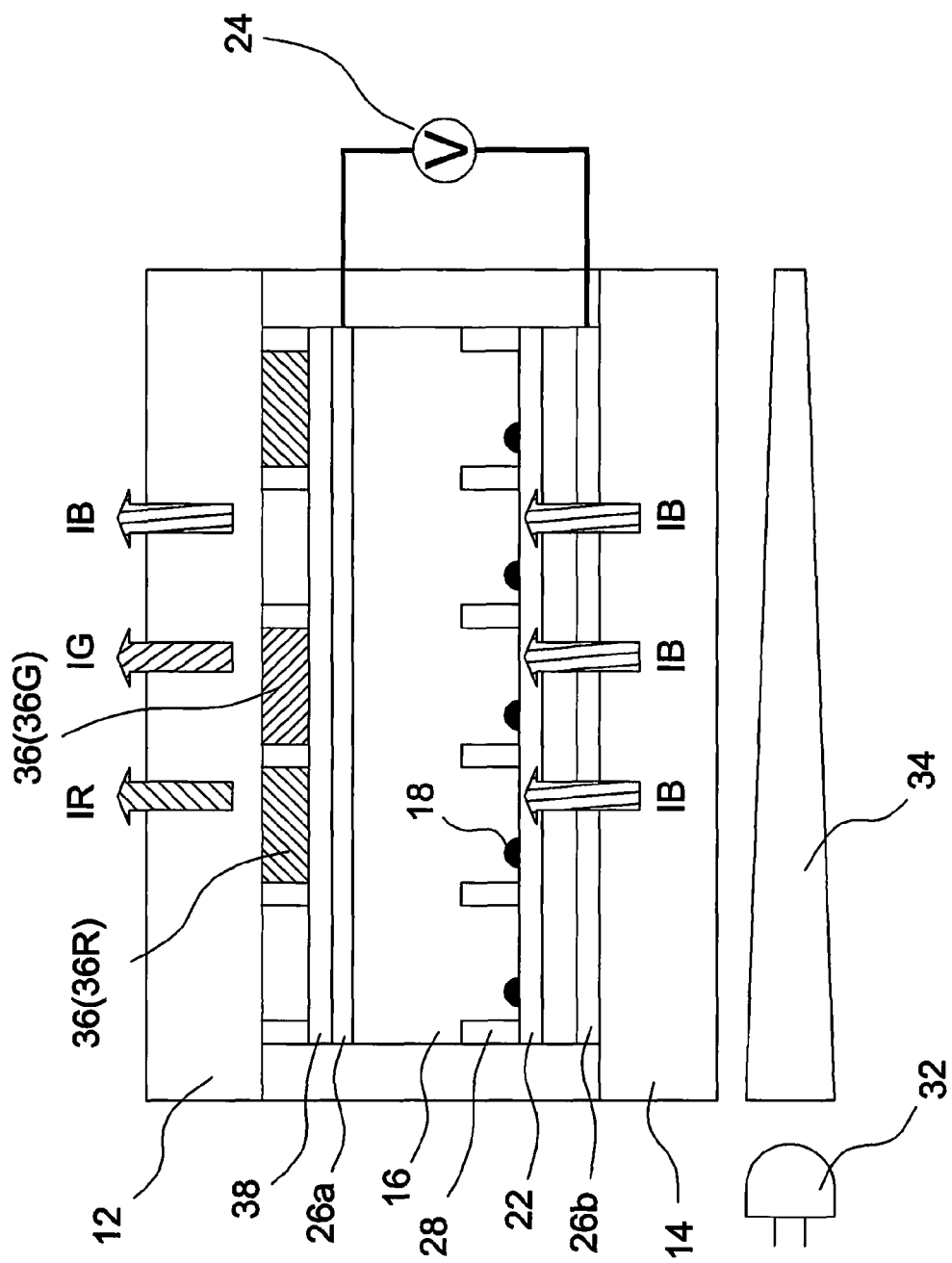
FIG. 7 shows a schematic diagram illustrating an electrowetting display device according to another embodiment of the invention.

FIG. 7 shows a schematic diagram illustrating an electrowetting display device 10e according to another embodiment of the invention. In this embodiment, the voltage source 24 is electrically connected to a transparent top electrode 26a and a transparent bottom electrode 26b, and, compared with the electrowetting display device 10a shown in FIG. 3, the overcoat layer 38 is disposed between the phosphor layer 36 and the transparent top electrode 26a. Certainly, the order of a stack of optical layers is not limited; for example, the position of the phosphor layer 36 and that of the transparent top electrode 26a may be exchanged with each other.

Figure 8:
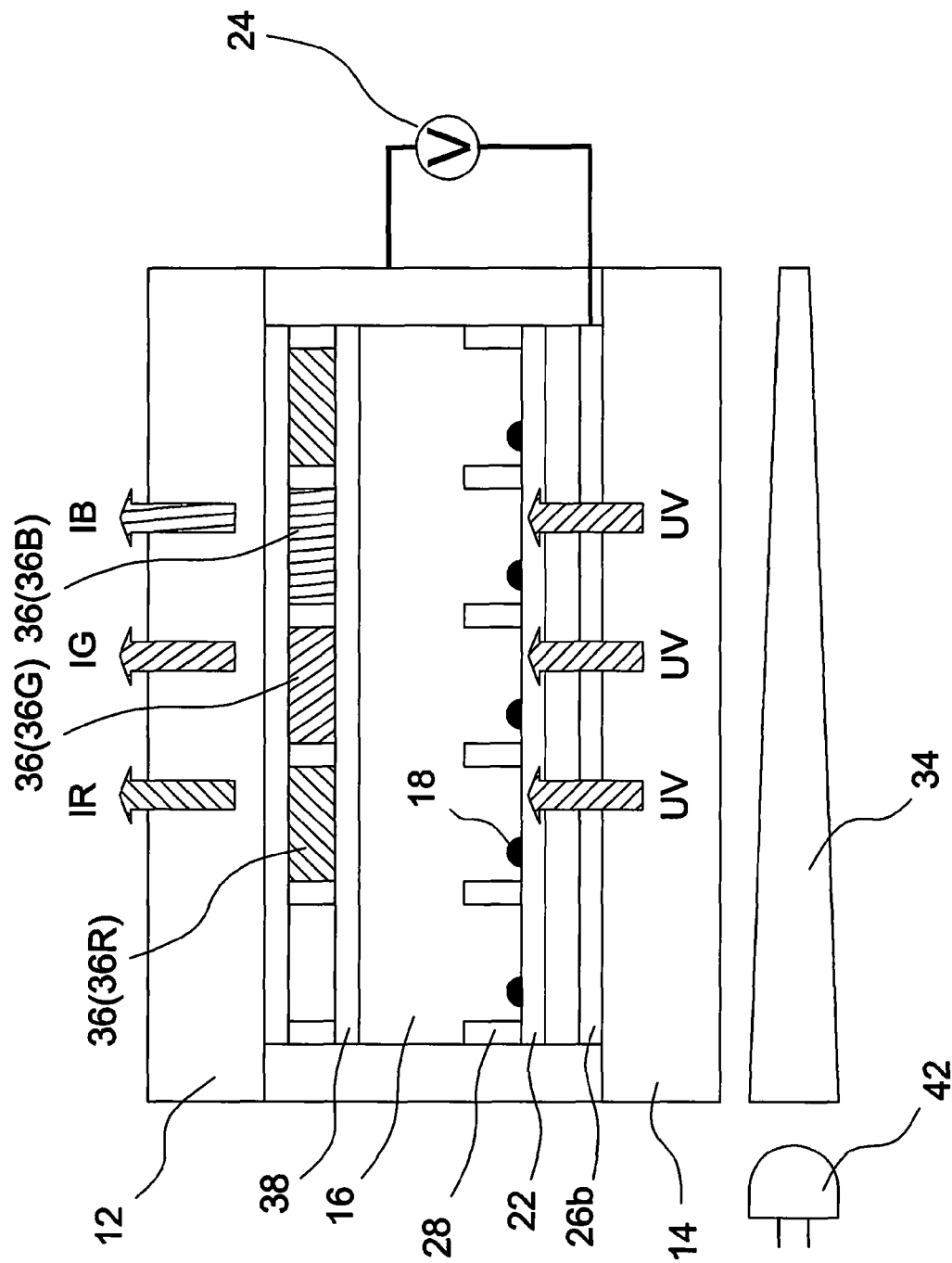
FIG. 8 shows a schematic diagram illustrating an electrowetting display device according to another embodiment of the invention.

FIG. 8 shows a schematic diagram illustrating an electrowetting display device 10f according to another embodiment of the invention. In this embodiment, an ultraviolet LED 32 is used as a backlight source, the phosphor layer 36 is formed on an inner side of the top substrate 12 facing the bottom substrate 14, and an overcoat layer 38 made of waterproof materials such as SiNx is formed on the phosphor layer 36. The phosphor layer 36 includes a first part that corresponds to a red pixel, a second part that corresponds to a green pixel, and a third part that corresponds to a blue pixel. The first part contains fluorescent materials 36R such as $Y_3Al_5O_{12}$:$Eu^{3+}$ or $Y_2O_3$:$Eu^{3+}$ to transform the ultraviolet light UV into red light IR, the second part contains fluorescent materials 36G such as $Y_3Al_5O_{12}$:$Tb^{3+}$ or $ZnSiO_4$:Mn to transform the ultraviolet light UV into green light IG, and the third part contains fluorescent materials 36B such as $CaWO_4$:Pb or $Y_2SiO_5$:Ce to transform the ultraviolet light UV into blue light IB. Hence, when the ultraviolet light UV passes the electrowetting display device 10f, the ultraviolet light UV are transformed into three primary colors of visible lights (red, green and blue) to achieve full-color display. Further, under the circumstance where the ultraviolet LED 42 is used as a backlight source, the formation position of the phosphor layer 36 is also not limited. For example, the phosphor layer 36 may be formed on an outer side of the top substrate 12 opposite the bottom substrate 14 (FIG. 4), on an inner side of the bottom substrate 14 facing the top substrate 12 (FIG. 5), or on an outer side of the bottom substrate 14 opposite the top substrate 12 (FIG. 6). Besides, in case the ultraviolet LED 42 is used as a backlight source, the voltage source 24 may be electrically connected to both a transparent top electrode 26a and a transparent bottom electrode 26b, or electrically connected to both the aqueous solution 16 and the transparent bottom electrode 26b. Similarly, the order of a stack of optical layers, such as the phosphor layer 36, the overcoat layer 38 and the transparent top electrode 26a, is also not limited.

Figure 9:
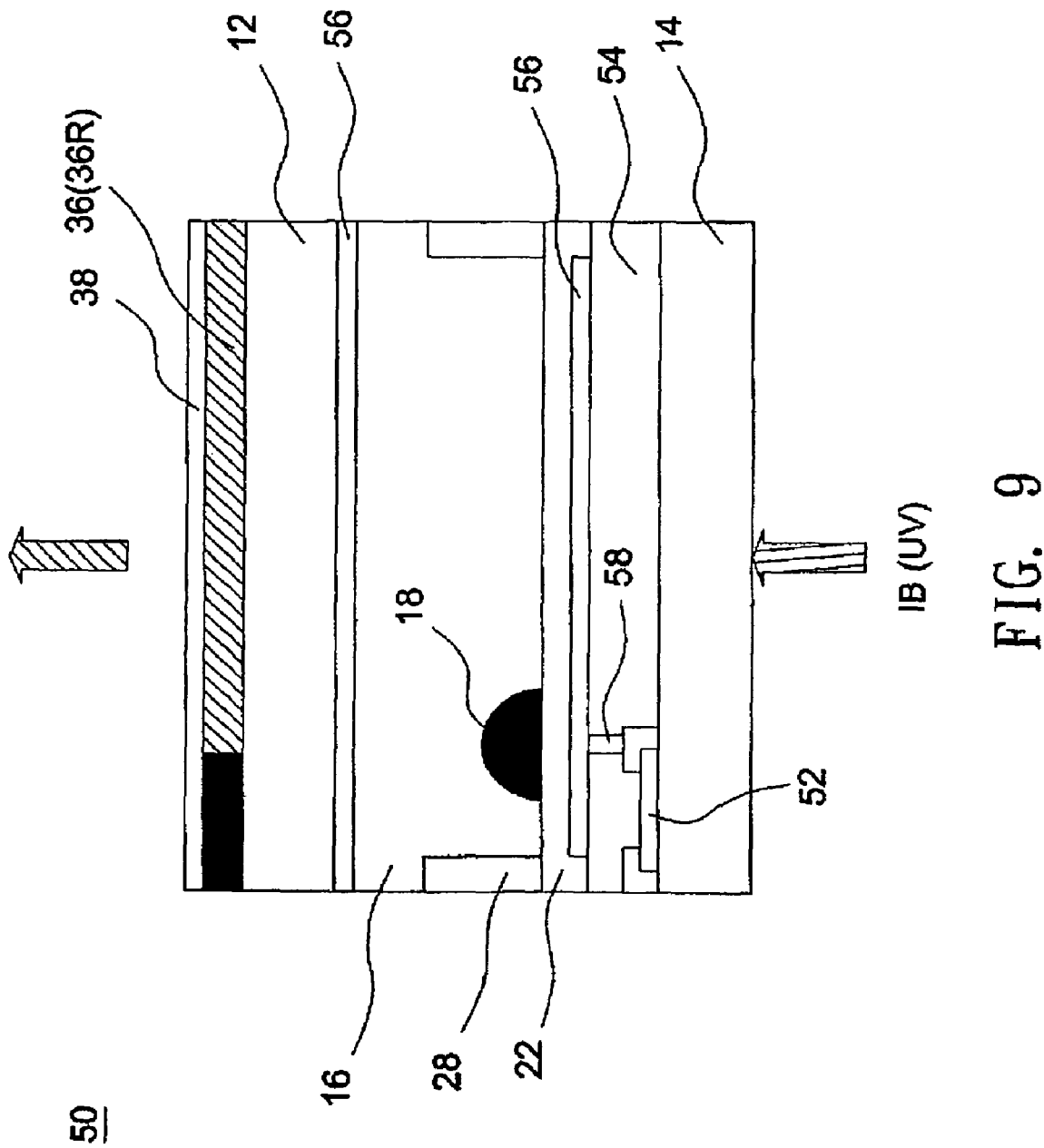
FIG. 9 shows a schematic diagram illustrating an electrowetting display device according to another embodiment of the invention.

FIG. 9 shows a schematic diagram illustrating an electrowetting display device 50 according to another embodiment of the invention. In this embodiment, the electrowetting display device 50 is an active-matrix type LCD, and FIG. 9 is depicted in view of a red pixel as an example. Referring to FIG. 9, the phosphor layer 36 is formed on a top substrate 12, and the blue light IB or ultraviolet light UV is transformed into the red light IR when it passes through the phosphor layer 36. Multiple partition walls 28 are formed on the bottom substrate 14 to divide the electrowetting display device 50 into multiple pixel units. A thin film transistor 52 is provided in the red pixel, and a flattened insulating layer 54 covers the thin film transistor 52. A transparent electrode 56 is formed on the flattened insulating layer 54 and underneath the top substrate 12 and electrically connected to the thin film transistor 52 via a contact hole 58. A hydrophobic dielectric layer 22 covers the transparent electrode 56 and the flattened insulating layer 54. In the electrowetting display device 50, the use of fluorescent materials to provide full color display is similar to the above embodiments, thus not explaining in detail here.

Figure 10:
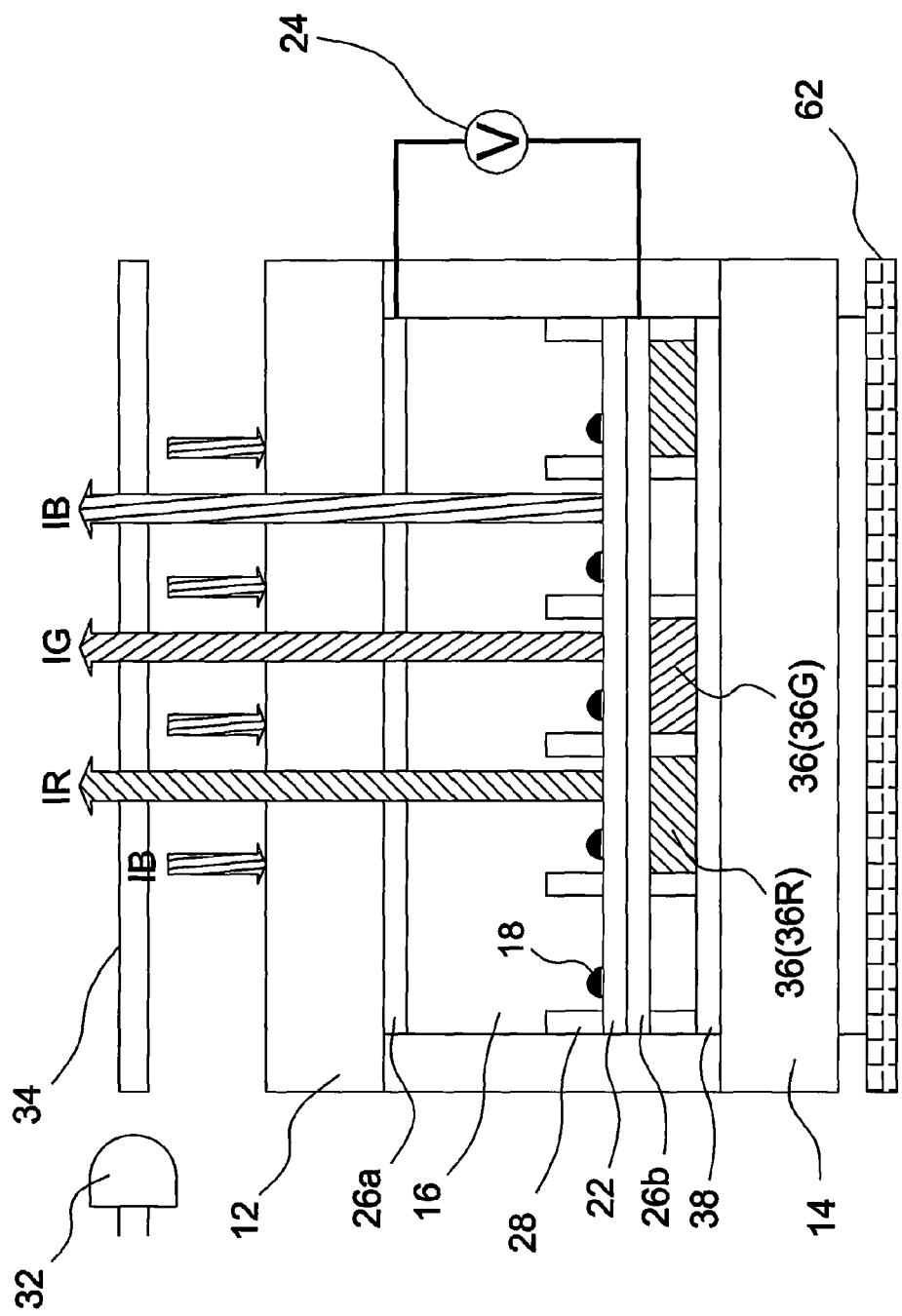
FIG. 10 shows a schematic diagram illustrating an electrowetting display device according to another embodiment of the invention.

FIG. 10 shows a schematic diagram illustrating an electrowetting display device 60 according to another embodiment of the invention. In this embodiment, the electrowetting display device 60 is a reflective type LCD, and the phosphor layer 36 and a reflective sheet 62 are respectively provided on two opposite sides of a bottom substrate 14. When blue light IB from a front light source (such as a blue light LED 32) enters the electrowetting display device 60 through a light guide plate 34 and a top substrate 12, different colors of lights are generated and then reflected by the reflective sheet 62 to achieve full color display. In the electrowetting display device 60, the use of fluorescent materials to provide full color display is similar to the above embodiments, thus not explaining in detail here.

According to the above embodiments, short wavelength light with high energy (such as blue light or ultraviolet light) is used as a light source for fluorescence excitation. On absorption of the energy, the electron in fluorescent materials moves to an excitation state at the next energy level, and finally this energy is released in the form of visible light (such as red light or green light) and the electron moves back down to a lower energy level. Thus, different wavelengths of visible light are obtained. As a result, when light from a light source such as an ultraviolet LED or a blue LED passes through or is transformed by the fluorescent materials of a phosphor layer, three primary colors of lights are obtained and then are controlled by light valves (the use of black ink) to achieve full color display. Compared with the conventional design, the above embodiments have simplified fabrication processes and are allowed to avoid the mix of surrounding white light or other colored light to increase color saturation. Further, the black ink that functions as light valves is opaque to achieve full black display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electrowetting display device, comprising:
   a first transparent substrate and a second transparent substrate facing each other;
   a plurality of partition walls formed between the first and the second transparent substrates to divide the electrowetting display device into a plurality of pixel units;
   a polar liquid disposed in each pixel unit;
   a non-polar liquid disposed in each pixel unit, the non-polar liquid being opaque and immiscible with the polar liquid; and
   a phosphor layer formed on at least one of the first transparent substrate and the second transparent substrate and receiving short-wavelength light incident to the electrowetting display device, the phosphor layer comprising a first part that transforms the short-wavelength light into a first light, a second part that transforms the short-wavelength light into a second light, and a third part that transforms the short-wavelength light into a third light or allows the short-wavelength light to pass therethrough without transformation, wherein the first light, the second light and the third light are visible light and their respective wavelength bands are different from each other, and each of the first, the second, and the third parts corresponds to one pixel unit.

2. The electrowetting display device as claimed in claim 1, wherein the short-wavelength light is blue light, the first part transforms the blue light into red light, the second part transforms the blue light into green light, and the third part of the phosphor layer allows the blue light to pass therethrough without transformation.

3. The electrowetting display device as claimed in claim 2, wherein the first part of the phosphor layer contains fluorescent materials of $CaS:Eu^{3+}$ or $Y_2O_2S:Eu^{3+}$.

4. The electrowetting display device as claimed in claim 2, wherein the second part of the phosphor layer contains fluorescent materials of $YBO_3:Ce^{3+}$, $YBO_3:Tb^{3+}$ or $SrGa_2O_4:Eu^{2+}$.

5. The electrowetting display device as claimed in claim 1, wherein the short-wavelength light is ultraviolet light and the third part of the phosphor layer transforms the ultraviolet light into blue light.

6. The electrowetting display device as claimed in claim 5, wherein the first part of the phosphor layer contains fluorescent materials of $Y_3Al_5O_{12}:Eu^{3+}$ or $Y_2O_3:Eu^{3+}$.

7. The electrowetting display device as claimed in claim 5, wherein the second part of the phosphor layer contains fluorescent materials of $Y_3Al_5O_{12}:Tb^{3+}$ or $ZnSiO_4$.

8. The electrowetting display device as claimed in claim 5, wherein the third part of the phosphor layer contains fluorescent materials of $CaWO_4:Pb$ or $Y_2SiO_5$.

9. The electrowetting display device as claimed in claim 1, wherein the polar liquid is an aqueous solution and the non-polar liquid is black ink.

10. The electrowetting display device as claimed in claim 1, further comprising a hydrophobic dielectric layer that is formed between the partition walls and the second transparent substrate and is in contact with the non-polar liquid.

11. The electrowetting display device as claimed in claim 1, wherein the phosphor layer is formed on an inner side of the first transparent substrate facing the second transparent substrate or an inner side of the second transparent substrate facing the first transparent substrate.

12. The electrowetting display device as claimed in claim 1, wherein the phosphor layer is formed on an outer side of the first transparent substrate opposite the second transparent substrate or an outer side of the second transparent substrate opposite the first transparent substrate.

13. The electrowetting display device as claimed in claim 1, further comprising an overcoat layer formed on the phosphor layer.

14. The electrowetting display device as claimed in claim 1, further comprising:
   a first transparent electrode formed on the first transparent substrate;
   a second transparent electrode formed on the second transparent substrate; and
   a voltage source electrically connected with the first and the second transparent electrodes.

15. An electrowetting display device, comprising:
   a first transparent substrate and a second transparent substrate facing each other;
   a phosphor layer formed on the first transparent substrate, the phosphor layer receiving short-wavelength light incident to the electrowetting display device and transforming the short-wavelength light into green light and red light;
   a plurality of partition walls formed on the second transparent substrate to divide the electrowetting display device into a plurality of pixel units;
   a plurality of thin film transistors formed on the second transparent substrate, wherein each of the pixel units has at least one thin film transistor;
   a polar liquid disposed in each pixel unit; and a non-polar liquid disposed in each pixel unit, the non-polar liquid being opaque and immiscible with the polar liquid.

16. The electrowetting display device as claimed in claim 15, further comprising:
   a flattened insulating layer formed on the second transparent substrate and covering the thin film transistors; and
   a hydrophobic dielectric layer formed on the flattened insulating layer.

17. The electrowetting display device as claimed in claim 15, wherein the short-wavelength light is blue light, the phosphor layer comprises a first part that transforms the blue light into red light, a second part that transforms the blue light into green light and a third part that allows the blue light to pass therethrough without transformation, and each of the first, the second, and the third parts corresponds to one pixel unit.

18. The electrowetting display device as claimed in claim 15, wherein the short-wavelength light is ultraviolet light, the phosphor layer comprises a first part that transforms the ultraviolet light into red light, a second part that transforms the ultraviolet light into green light and a third part that transforms the ultraviolet light into blue light, and each of the first, the second, and the third parts corresponds to one pixel unit.

19. The electrowetting display device as claimed in claim 15, wherein the polar liquid is an aqueous solution and the non-polar liquid is black ink.

20. An electrowetting display device, comprising:
   a first transparent substrate and a second transparent substrate facing each other;
   a plurality of partition walls formed between the first and the second transparent substrates to divide the electrowetting display device into a plurality of pixel units;
   a polar liquid disposed in each pixel unit;
   a non-polar liquid disposed in each pixel unit, the non-polar liquid being opaque and immiscible with the polar liquid;
      a phosphor layer formed on the second transparent substrate, the phosphor layer receiving short-wavelength light incident to the first transparent substrate and transforming the short-wavelength light into green light and red light; and
      a reflective sheet disposed on an outer side of the second transparent substrate opposite the phosphor layer.

* * * * *